Nov. 13, 1951     J. C. BARNES     2,574,612
CUP AND COVER
Filed Aug. 19, 1949

INVENTOR.
James C. Barnes
BY
McMorrow, Berman + Davidson
ATTORNEYS

Patented Nov. 13, 1951

2,574,612

UNITED STATES PATENT OFFICE 2,574,612

CUP AND COVER

James C. Barnes, Chicago, Ill.

Application August 19, 1949, Serial No. 111,259

2 Claims. (Cl. 65—31)

This invention relates to an improved covered container, especially a drinking cup, with which the cover is removably associated, and to improved construction for such a cover, wherein a portion is movable to enable the contents of the cup to be poured therefrom or drunk directly from the cup, the primary object of the invention being to provide a device of this kind which enables hot or cold liquid, dispensed from such as a vacuum bottle into a cup, to be kept hot or cold therein longer than otherwise would be the case, and to protect the contents of the cup from contamination by dust, dirt and the like between drinks therefrom.

Another important object of the invention is to provide a practical, efficient and low-cost cover which is readily attached to and removable from a cup or the like, such as the cup associated with a vacuum bottle, having a drinking and pouring opening closable by a slide which is operable as desired by the user.

Other important objects and advantageous features of my invention will be apparent from the following description and the accompanying drawings, wherein, merely for purposes of illustration, a specific embodiment of the invention is set forth in detail.

Figure 1:
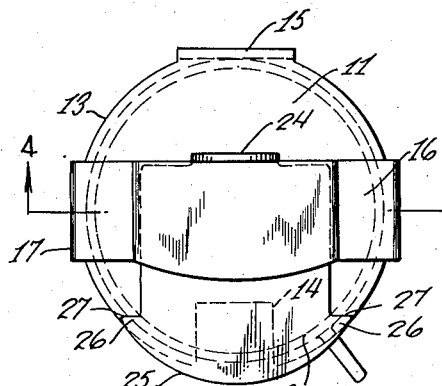
Figure 1 is a top plan view, showing the cover closure in closed position.

Referring in detail to the drawings, wherein like numerals designate like parts throughout the several views, the numeral 6 generally designates a cup, such as a cup associated with a vacuum bottle (not shown), having a circular rim 7 from which the side wall 8 curvedly converges toward the bottom 9. Mounted upon the rim 7 and gripping the outside of the side wall 8 is the detachable cover 10.

The cover 10 comprises a disc 11 having substantially the same, or a slightly larger, outside diameter as the cup rim 7 and having secured to the under side thereof a circular gasket 12 to conformably engage the upper edge of the rim 7 and provide an air-tight seal between the disc 11 and the rim 7.

One side of the disc 11 is cut through its peripheral edge 13 to provide a substantially square drinking and pouring opening 14. The diametrically-opposite side of the disc 11 has an extension 15 depending from and preferably formed on the peripheral edge 13 and curved transversely and downwardly and inwardly to conformably and frictionally engage the subjacent area of the outside of the cup side wall 8 for a substantial distance below the rim 7.

Secured by suitable means upon the upper side of the disc 11 is a diametrical plate 16 terminating at its opposite ends in depending extensions 17, shaped and curved like the extension 15 of the disc 11 and equidistantly spaced from opposite sides thereof, to frictionally engage the outside of the cup side wall 8 and thereby firmly mount the cover 10 in place on the cup 6, with the gasket 12 compressed upon the rim 7.

Figure 2:
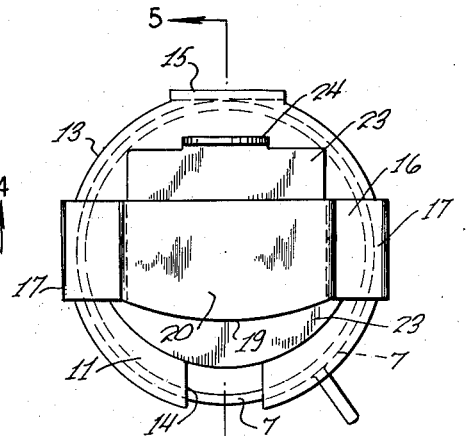
Figure 2 is a similar view, with the closure open.
Figure 3:
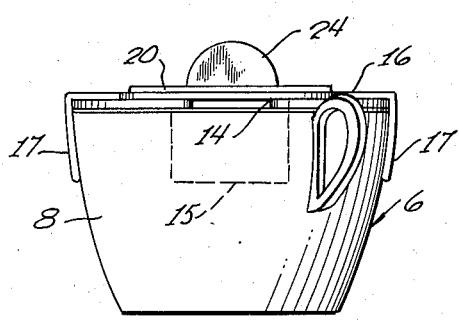
Figure 3 is a rear elevation.
Figure 4:
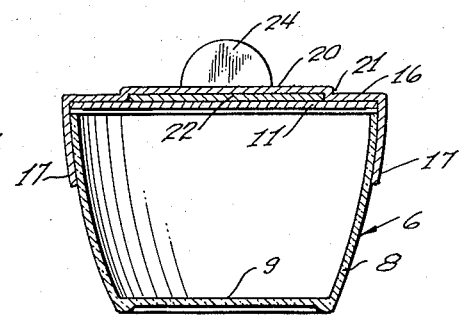
Figure 4 is a transverse vertical section taken on the line 4—4 of Figure 1.
Figure 5:
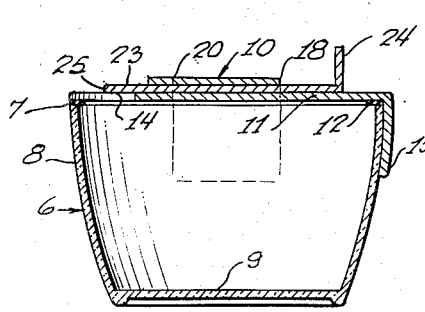
Figure 5 is a transverse vertical section, taken at right angles to Figure 4, on the line 5—5 of Figure 2.

The edge 18 of the plate 16 facing the disc extension 15 is straight, whereas, an intermediate portion 19 of the opposite edge of the plate 16 is curved, as shown in Figures 1 and 2. The said curved intermediate edge portion 19 corresponds in length with an upwardly-offset portion 20 of the plate 16, which, with the upper surface of the disc 11, forms a closed parallel-sided slideway 21 for the slide closure 22.

The slide closure 22 comprises a parallel-sided, flat plate 23 confined in the slideway 21 and having an up-turned finger piece portion 24 on the end thereof facing the disc extension 15. The finger piece 24 is arranged to engage the edge 18 of the plate 16 so as to limit movement of the closure 22 to fully closed relation to the pouring and drinking opening 14.

The end of the closure plate 23 opposite the finger piece 24 has an edge 25 curved to conform to the curvature of the peripheral edge 13 of the disc 11, the edge 25 extending beyond the sides of the closure plate 23 along laterals 26, 26 which define shoulders 27, 27 to engage the adjacent edge of the plate 16 in the fully opened position of the closure plate 23.

The cover 10 may be made of any suitable material or combinations of suitable materials, with the gripping fingers 15 and 17, 17 being sufficiently flexible and resilient to be capable of being sprung over the cup rim 7 into frictional conformance with the outside of the cup side wall 8.

I claim:

1. A cover for a container having a rim at the upper end of a side wall, comprising a plate adapted to rest upon the rim, a depending extension on the edge of said plate, said plate being formed with a drinking and pouring opening diametrically opposite said extension, other extensions depending from said plate in circumferentially-spaced relation to the first-mentioned extension, said extensions being arranged to frictionally engage the outside of the container side wall and maintain said plate engaged with the cup rim, a member on the upper side of said plate having a channel portion spaced upwardly from said plate and with said plate defining a slideway extending crosswise of said plate, and a closure plate slidably confined in said slideway and engaging the upper surface of said plate, said closure plate being movable from a position in which said closure plate completely closes said drinking and pouring opening to a position in which said closure plate completely exposes said drinking and pouring opening, said member comprising another plate secured to the upper side of the first-mentioned plate and having said other extensions on its opposite ends.

2. A cover for a container having a rim at the upper end of a side wall, comprising a plate adapted to rest upon the rim, a depending extension on the edge of said plate, said plate being formed with a drinking and pouring opening diametrically opposite said extension, other extensions depending from said plate in circumferentially-spaced relation to the first-mentioned extension, said extensions being arranged to frictionally engage the outside of the container side wall and maintain said plate engaged with the cup rim, a member on the upper side of said plate having a channel portion spaced upwardly from said plate and with said plate defining a slideway extending crosswise of said plate, and a closure plate slidably confined in said slideway and engaging the upper surface of said plate, said closure plate being movable from a position in which said closure plate completely closes said drinking and pouring opening to a position in which said closure plate completely exposes said drinking and pouring opening, said member comprising another plate secured to the upper side of the first-mentioned plate and having said other extensions on its opposite ends, said channel portion of said member being formed intermediate the ends of said other plate and having parallel sides, and said closure plate having parallel edges slidably engaging the parallel sides of said channel portion.

JAMES C. BARNES.

REFERENCES CITED

The following references are of record in the file of this patent:

UNITED STATES PATENTS

| Number | Name | Date |
|---|---|---|
| 77,914 | Raymond | May 12, 1868 |
| 183,673 | Horton | Oct. 24, 1876 |
| 357,958 | Horn | Feb. 15, 1887 |
| 1,050,794 | Bell | Jan. 21, 1913 |
| 1,084,306 | Whipple | Jan. 13, 1914 |
| 1,177,891 | Pacorek | Apr. 4, 1916 |
| 1,283,447 | Anthony | Nov. 5, 1918 |
| 1,890,460 | Gebhard | Dec. 13, 1932 |
| 1,952,016 | Kreidler | Mar. 20, 1934 |
| 1,981,112 | Lee | Nov. 20, 1934 |
| 2,155,606 | Lewis | Apr. 25, 1939 |
| 2,193,232 | Hacmac | Mar. 12, 1940 |